Figure 1:
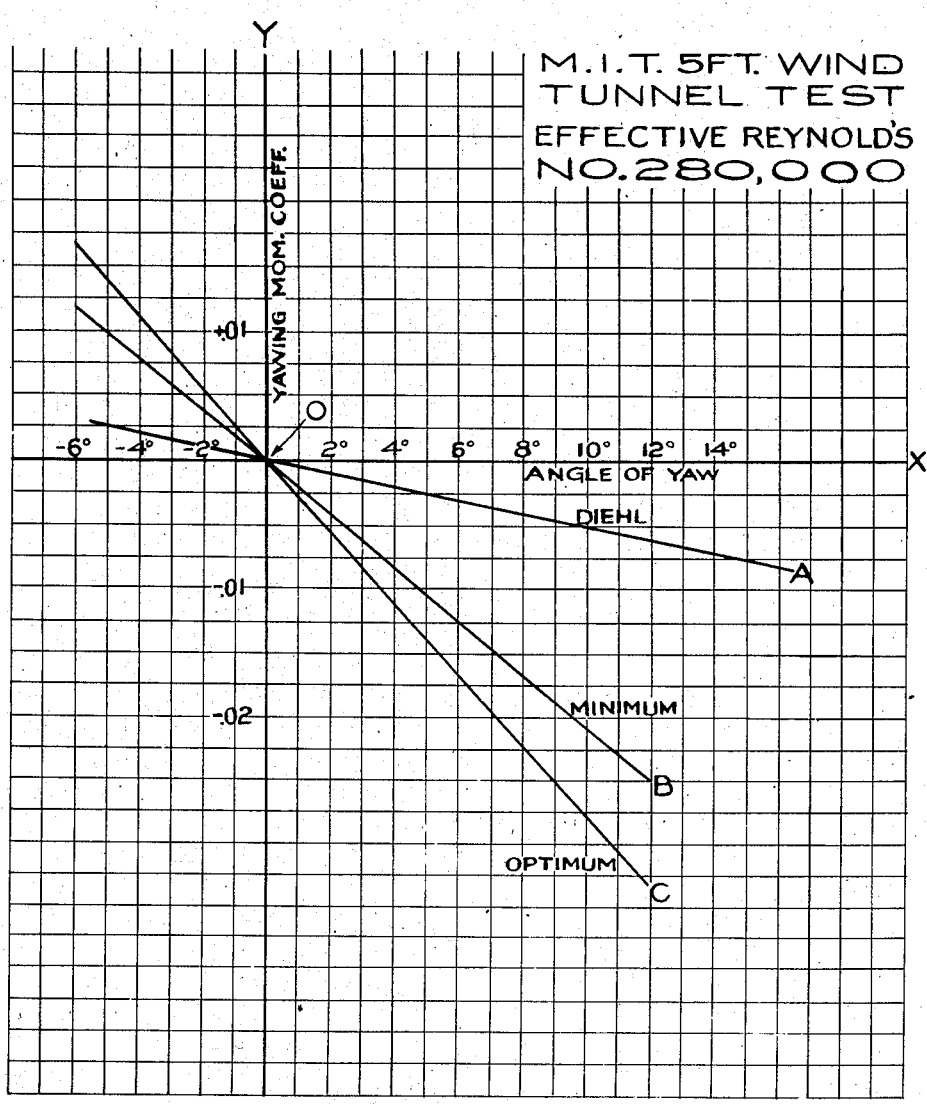

April 16, 1940. O. C. KOPPEN 2,196,994
AIRPLANE
Filed Feb. 23, 1939 2 Sheets-Sheet 1

INVENTOR
Otto C. Koppen
BY H. L. Kirkpatrick
ATTORNEY

April 16, 1940.   O. C. KOPPEN   2,196,994
AIRPLANE
Filed Feb. 23, 1939   2 Sheets-Sheet 2
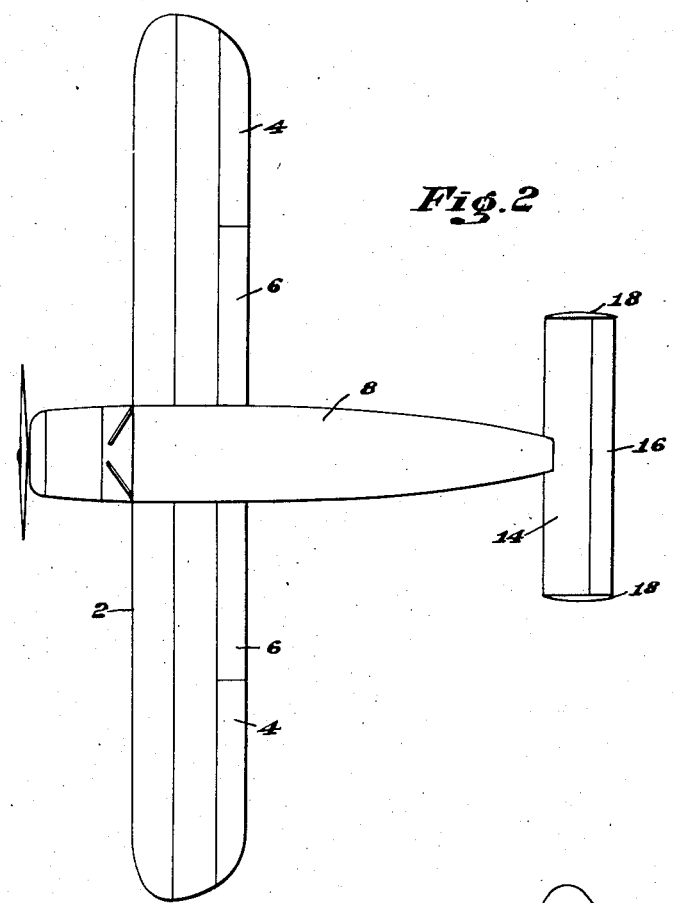
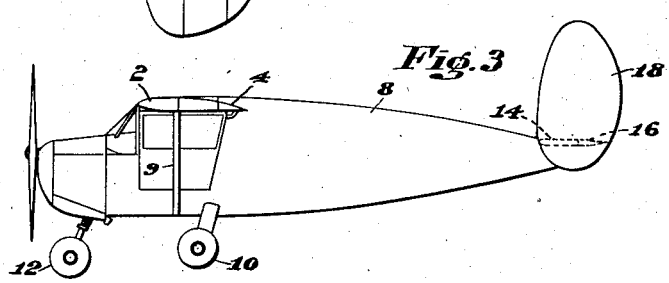
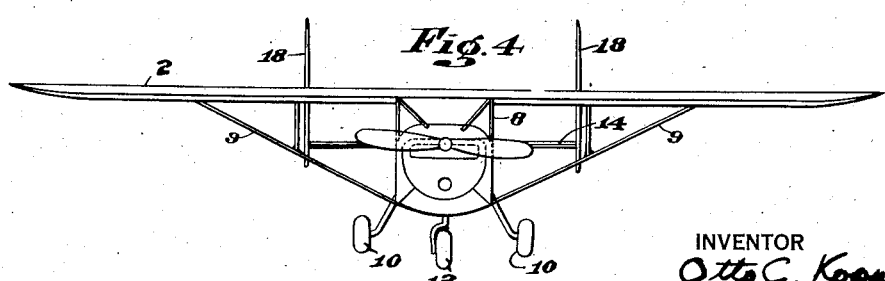
INVENTOR
Otto C. Koppen
BY H. L. Kirkpatrick
ATTORNEY Patented Apr. 16, 1940

2,196,994

UNITED STATES PATENT OFFICE 2,196,994

AIRPLANE

Otto C. Koppen, Waban, Mass., assignor to Edward J. Frost, Auburndale, Mass., as trustee Application February 23, 1939, Serial No. 257,863

10 Claims. (Cl. 244—75)

This invention relates to airplanes and has for its object to provide a directionally stable, two-control airplane constructed and arranged to be flown with ailerons and elevator only, that is, a practicable rudderless airplane. Such airplane is capable of satisfying the present and growing demand for a simplified, more easily controlled and safer airplane which obviates the necessity of so much training and skill, as at present required, before one is able properly and safely to fly an airplane.

In the drawings Figure 1 is a graph showing yawing moment coefficients plotted against angles of yaw; Figure 2 is a plan view of an aircraft according to a preferred embodiment of my invention; Figure 3 is a side elevation thereof; and Figure 4 is a front elevation of said aircraft.

Practically all present day airplanes are of the three-control type with ailerons and elevator operated by the hands and with a rudder operated by the feet. It requires a considerable amount of training, skill, and frequent practice in order that one may properly and safely coordinate the movements of the hands in the operation of the ailerons and of the feet in the operation of the rudder, as required in all such present day three-control airplanes. This coordination requires operation of both the ailerons and the rudder to counteract the disturbances to stable flight and to turn and maneuver the airplane. These disturbances are commonly due to rough air and to yaw and drag of most types of ailerons when depressed in making a turn and in straightening out after a turn. Coordination of the rudder and the ailerons is necessary also to minimize wallowing, (particularly in airplanes having a low ratio of directional to lateral stability). The chief functions of an airplane rudder are to overcome aileron yaw; to counteract the yawing moment due to rolling velocity; to overcome the damping of yaw in a steady turn; and to counteract the effects of the rotation of the propeller slip-stream. In all these circumstances the rudder must be moved to the proper extent, at the proper time, and at the proper rate, in varying degree as demanded by the particular flight conditions prevailing.

Because of these conditions which require a rudder, and in spite of the demand for simplified airplanes, only a very few two-control or rudderless airplanes have been built and flown. But in such two-control airplanes many, if not all, of the above mentioned conditions for which the rudder is used in three-control airplanes are still present to an objectionable and even dangerous degree, particularly at low air speeds and at high angles of attack. This has remained true despite efforts to eliminate or minimize such disadvantages by various means such as angularly disposed vertical fins (with resultant increase in drag), trimming means (which are really in the nature of a rudder), and even a rudder or rudders tied in with and actuated by the aileron control stick or wheel, thus really making a three-control airplane. Such additional and cumbersome means and devices have adversely affected both the control and performance, as well as the safety of such two-control airplanes as have yet been known.

I have discovered how to construct a two-control or rudderless airplane which can be flown with adequate and positive control by ailerons and elevator only, and which wholly avoids all of the above mentioned defects and disadvantages of that type, and possesses, moreover, many advantages over known airplanes, whether of the three-control or of the two-control type. This invention provides a successful, simple two-control airplane which in flight has proved to be directionally stable to an exceptional degree, in rough as well as smooth air; which by aileron movement only can be smoothly turned, gradually or sharply as required,—even by inexperienced pilots; which does not wallow or swerve from side to side in either straight or turning flight; which has neither material hesitation nor aileron yaw either in initiating or recovering from a turn; and which compensates for damping of yaw in a turn;—all of which desirable characteristics are present whether the airplane be in climbing, cruising, or gliding flight, or whether it be taking off or landing.

In the design of airplanes, the factor of yawing moment must be and has been taken into account. As is well known, when an airplane is turned to an angle of yaw $\psi$ to its direction of flight, it presents surfaces at such angle of yaw to the flow of air. Such surfaces have an effective area $a$ and a center of pressure which is located in the airplane at a distance $l$ behind a vertical axis through the center of gravity. The force, acting at the center of pressure, required to balance the force exerted by the air flow and tending to restore the longitudinal axis of the airplane to its direction of flight may be called $w$. The yawing moment is the product of those three factors, i. e. yawing moment equals $a \times l \times w$. Of these factors, $a$ and $l$ are constants for a given airplane, but $w$ varies with the angle of yaw through which the airplane has turned.

The yawing moment coefficient $C_n$, as is well known in the art, is obtained by the following formula:

$$C_n = \frac{\text{yawing moment}}{q \times S \times b}$$

$q = $ dynamic pressure $= \frac{dv^2}{2}$ $d = $ the density of the air
$v = $ the velocity of the air
$S = $ wing area
$b = $ wing span $C_n$ (yawing moment coefficient) may be plotted on the axis of Y in the usual system of ordinates against $\psi$ (the angle of yaw) on the axis of X. This plot results in a line or curve passing through the origine and having a slope, i. e. making an angle with the axis of X. This line is known in the art as the "yawing moment curve". In the U. S. National Advisory Committee for Aeronautics sign convention employed in this country and used herein, a negative sign of the slope of the yawing moment curve indicates directional stability.

I have discovered that a rudderless airplane has all characteristics necessary for successful and easily controlled flight, both straight and turning, when the slope of the line of the yawing moment curve is in excess of —.0020 per degree of angle of yaw, with an optimum of the order of —.0027 to —.0030 per degree. The data for obtaining these values were obtained from wind tunnel tests of a scale model of the rudderless airplane of this invention.

That the principles of my invention involve a radical departure from present practice is illustrated by comparing the slope of the yawing moment curve, which is characteristic of my invention, with the slope of the yawing moment curve of an airplane of equal wing-loading, for example, of a three-control airplane having a wing loading of 10 lbs. per square foot, representing an average of 5—15 lbs. wing loading of present-day normal general-purpose airplanes in common use. The invention, however, may be employed in airplanes having wing loadings in excess of 15 lbs. per square foot.

In Figure 1 line OA represents the conventional practice and requirements in three-control airplanes based on the accepted authority of Engineering Aerodynamics, by Walter S. Diehl, 1936 rev. ed., p. 206. This practice has also been followed in the design of two-control airplanes. The line OA has a slope from the horizontal axis of X of —.0005 $C_n$ per degree of angle of yaw.

The slope of the line OB represents (in terms of $C_n$ per degree of angle of yaw) what I have found by actual flight to be the practicable minimum in a rudderless airplane embodying my invention, i. e. —.0020 per degree. This, in the above comparison, is four times the value of Diehl's criterion of directional stability.

The slope of the line OC represents what I have found by actual flight, to give optimum results, i. e. —.0028 per degree. This, in the above comparison, is 5.6 times the value of Diehl's criterion of directional stability. Expressed trigonometrically, the line OB, representing my minimum, has a negative slope or tangent which is four times the tangent of the Diehl line OA, and my optimum line OC has a negative slope or tangent which is 5.6 times the tangent of the Diehl line.

Substantial benefits can be obtained in rudderless airplanes embodying the principles of my invention having negative slopes of yawing moment curves somewhat less than —.0028 per degree and down to the minimum of —.0020 per degree, but at some sacrifice of directional stability and control, turning characteristics, and responsiveness, particularly at less than cruising speed. It is preferred to have an airplane which embodies a yawing moment curve having a slope of the order of —.0027 to —.0030 per degree, which is in the range of the optimum in view of experience to date. Full benefits of the invention, however, from the standpoints of stability, turning, and control, can be obtained by an airplane embodying a yawing moment curve having a slope in excess of the said optimum, but with some limitations on account of considerations of weight, dimensions, structural strength of fuselage required, expense, and appearance.

For the purpose of illustrating the above mentioned typical preferred embodiment of this invention in a small two-seater, single-propeller, high-wing braced monoplane with tricycle landing gear, three views are shown in the drawings. Though the invention is here shown only in connection with a small single propeller airplane, it is applicable to both single and multi-propeller airplanes of various types and sizes. Though the invention has been described only in connection with airplanes having rearwardly extending means for supporting tail portions (such as a fuselage or booms), the principles of the invention are also applicable to tailless airplanes in which the wings are swept-back sufficiently so that the necessary vertical fin surfaces may be affixed at or near the ends of the wings and rearwardly of the center of gravity.

Referring to the drawings, in which like numerals represent like parts, the wing 2 of the conventional airfoil section having ailerons 4 and flaps 6 is affixed to fuselage 8 and braced therefrom by braces 9. To the fuselage 8 are suitably affixed main landing wheels 10 and nose wheel 12, though present-day conventional landing gear with suitable brakes will answer. The fuselage 8 carries at the rear end thereof a stabilizer 14 having hingedly affixed thereto elevator 16. The ailerons and elevator may be controlled by either a "stick" or Deperdussin wheel (not shown). The foregoing is common practice. The airplane has no rudder, and affixed to the stabilizer is a pair of vertical fins 18 substantially parallel to the longitudinal axis of the fuselage. These fins are sufficiently spaced apart, as shown, so as to be substantially free from the turning and rolling effect of slip-stream rotation. In such an airplane, if provided instead with the usual vertical fin and rudder, Diehl's criterion would have called for a vertical fin and rudder having an aggregate area of the order of but 5%–7% of the wing area. But according to the principles of my invention, the optimum aggregate area of the vertical fins in the airplane herein shown is of the order of 20%–22% of the wing area, thus providing a yawing moment curve with a slope of substantially —.0028 for each degree of angle of yaw, the line OC of Fig. 1. The practicable minimum of the ratio of aggregate fin area to wing area in this airplane is about 14% or 15%, which corresponds to the line OB of Fig. 1.

There may be a single fin or a plurality of fins as shown, provided it or they are so supported and placed as to avoid the turning and rolling effect of propeller slip-stream rotation. If there are several fins they must be spaced sufficiently far apart to avoid interference.

The rudderless airplane of this invention, as a practical matter and in all normal conditions of flight, maintains a substantially zero angle of yaw. Thus, it maintains straight flight or turning flight, as the case may be, when the ailerons are in neutral, but also properly turns or straightens from a turn, as the case may be, when the ailerons are displaced from neutral.

Having described my invention and typical preferred embodiment thereof, I claim:

1. In a rudderless airplane, a supporting wing, ailerons on the wing, a fuselage having nose, body and tail portions, a stabilizer and elevator mounted on the rear end of the fuselage, and laterally spaced fixed vertical fins, the length of said tail portion and the aggregate area of said vertical fins being such as with the aforesaid related elements of the airplane to provide a stable yawing moment curve having a slope in excess of minus .0020 per degree of angle of yaw.

2. In a rudderless airplane, a supporting wing, ailerons on the wing, a fuselage having nose, body and tail portions, a stabilizer and elevator mounted on the rear end of the fuselage, and laterally spaced fixed vertical fins, the length of said tail portion and the aggregate area of said vertical fins being such as with the aforesaid related elements of the airplane to provide a stable yawing moment curve having a slope of the order of minus .0027–.0030 per degree of angle of yaw.

3. In a rudderless airplane, a body, a supporting wing, ailerons on the wing, tail group supporting means, a tail group including a stabilizer, elevator, and laterally spaced fixed vertical fins, the length of said tail group supporting means and the aggregate area of said vertical fins being such as with the aforesaid related elements of the airplane to provide a stable yawing moment curve having a slope in excess of minus .0020 per degree of angle of yaw.

4. In a rudderless airplane, a body, a supporting wing, ailerons on the wing, tail group supporting means, a tail group including a stabilizer, elevator, and laterally spaced fixed vertical fins, the length of said tail group supporting means and the area of said vertical fins being such as with the aforesaid related elements of the airplane to provide a stable yawing moment curve having a slope of the order of minus .0027–.0030 per degree of angle of yaw.

5. In a rudderless airplane, a supporting wing, ailerons on the wing, a fuselage having nose, body and tail portions, a stabilizer and elevator, and at least one fixed vertical fin, the length of said tail portion and the aggregate vertical fin area being such as with the aforesaid related elements of the airplane to provide a stable yawing moment curve having a slope in excess of minus .0020 per degree of angle of yaw.

6. In a rudderless airplane, a supporting wing, ailerons on the wing, a fuselage having nose, body and tail portions, a stabilizer and elevator, and at least one fixed vertical fin, the length of said tail portion and the aggregate vertical fin area being such as with the aforesaid related elements of the airplane to provide a stable yawing moment curve having a slope of the order of minus .0027–.0030 per degree of angle of yaw.

7. In a rudderless airplane, a body, a supporting wing, ailerons on the wing, tail group supporting means, a tail group including a stabilizer, elevator, and at least one fixed vertical fin, the length of said tail group supporting means and the aggregate vertical fin area being such as with the aforesaid related elements of the airplane to provide a stable yawing moment curve having a slope in excess of minus .0020 per degree of angle of yaw.

8. In a rudderless airplane, a body, a supporting wing, ailerons on the wing, tail group supporting means, a tail group including a stabilizer, elevator, and at least one fixed vertical fin, the length of said tail group supporting means and the aggregate vertical fin area being such as with the aforesaid related elements of the airplane to provide a stable yawing moment curve having a slope of the order of minus .0027–.0030 per degree of angle of yaw.

9. In a rudderless airplane, a body, a supporting wing, ailerons on the wing, a plurality of fixed vertical fins positioned and held rearwardly of the center of gravity of the airplane, the aggregate vertical fin area and the distance thereof from the center of gravity being such as with the aforesaid related elements of the airplane to provide a stable yawing moment curve having a slope of the order of minus .0027–.0030 per degree of angle of yaw.

10. In a rudderless airplane, a body, a supporting wing, ailerons on the wing, a plurality of fixed vertical fins positioned and held rearwardly of the center of gravity of the airplane, the aggregate vertical fin area and the distance thereof from the center of gravity being such as with the aforesaid related elements of the airplane to provide a stable yawing moment curve having a slope in excess of minus .0020 per degree of angle of yaw.

OTTO C. KOPPEN.